Figure 1:
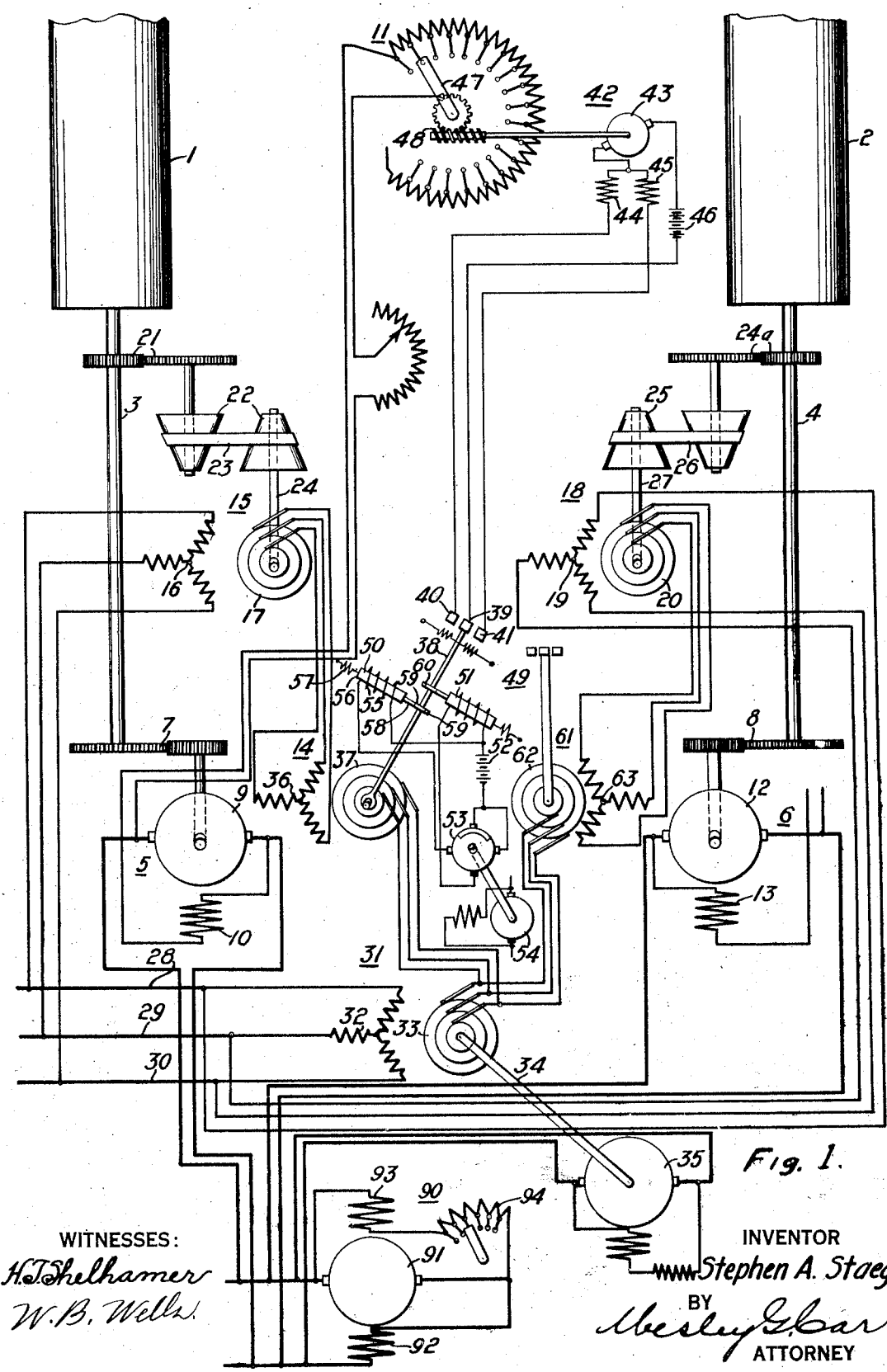

Sept. 15, 1925.           1,553,406
S. A. STAEGE
SPEED REGULATOR SYSTEM
Filed Oct. 2, 1919          2 Sheets-Sheet 1

WITNESSES:
H. T. Shelhamer
W. B. Wells

INVENTOR
Stephen A. Staege
BY
Wesley G. Carr
ATTORNEY

Sept. 15, 1925.  1,553,406

S. A. STAEGE

SPEED REGULATOR SYSTEM

Filed Oct. 2, 1919  2 Sheets-Sheet 2

WITNESSES:
H. J. Shelhamer
W. B. Wells

INVENTOR
Stephen A. Staege
BY
Wesley G. Carr
ATTORNEY

Patented Sept. 15, 1925.

1,553,406

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed October 2, 1919. Serial No. 327,992.

*To all whom it may concern:*

Be it known that I, STEPHEN A. STAEGE, a citizen of the United States, and a resident of Pittsburgh, in the county of Allegheny and State of Pennsylvania, have invented a new and useful Improvement in Speed-Regulator Systems, of which the following is a specification.

My invention relates to speed-regulator systems and particularly to regulator systems for maintaining a substantially-constant speed ratio between rotating members.

One object of my invention is to provide a speed-regulator system that shall be simple and effective in operation, that shall control a number of rotating members to maintain a constant speed ratio between them, and that shall effect change in the speed of all members, at will, without disturbing the speed ratio.

In many industrial establishments, it is essential to operate a number of rotating members at a constant speed ratio and it is very often desirable to be able to change the speed of all members according to operating conditions. Thus, in a paper mill it is essential to maintain a constant speed ratio between the various rolls through which the paper is passing in order to maintain an even tension upon the paper and, at certain times, it is essential, for efficient operation, that the speed of all rolls be changed to vary the speed of the paper passing through the rolls.

In a regulator system constructed in accordance with my invention, the speeds of all the rotating members are so dependent upon the frequency of an alternating-current supply circuit as to maintain the speed ratio of the rotating parts substantially constant.

In the preferred method of practicing my invention, each rotating member is propelled by a motor, preferably a shunt-wound motor, and a rheostat is connected in circuit with the field winding of the motor for varying its excitation to control the speed of the rotating member. Each rotating member operates a frequency changer, and a common frequency changer is provided which is operated by any suitable auxiliary motor, the speed of which may be adjusted at will. An alternating-current supply circuit of any suitable frequency is connected to the primary windings of each of said frequency changers. Each rotating member is provided with an induction motor, the primary winding of which is connected to the secondary winding of the associated frequency changer and the secondary winding of which is connected to the secondary winding of the common frequency changer. Thus, it is apparent that any change in speed of the rotating member will deliver a frequency to the primary winding of the induction motor in accordance with such change and, accordingly, the induction motor is operated in a clockwise or in a counter-clockwise direction, according to the change in the speed of the rotating member.

It is assumed that, under normal operating conditions, the frequency changer operated by the rotating member and the frequency changer operated by the auxiliary motor deliver currents of the same frequency to the induction motor operating as a differential machine so that no torque is produced by the induction motor until there is a variation in speed of the rotating member to cause a change in the frequency of the current supplied by it to the induction motor. The induction motor is provided with a contact-making device for controlling the rheostat which is in circuit with the field winding of the propelling motor for the rotating member. Moreover, means is provided for intermittently operating the contact-making device to effect a step-by-step movement of the rheostat and thus prevent overtravel and the so-called hunting action. In the above manner, the excitation of each propelling motor is governed to maintain the speed ratio between all the rotating members substantially constant. If it is desired to change the speed of all rotating members without disturbing the speed ratio between them, it is merely necessary to change the voltage of the generator which supplies power to all the propelling motors.

Figure 2:
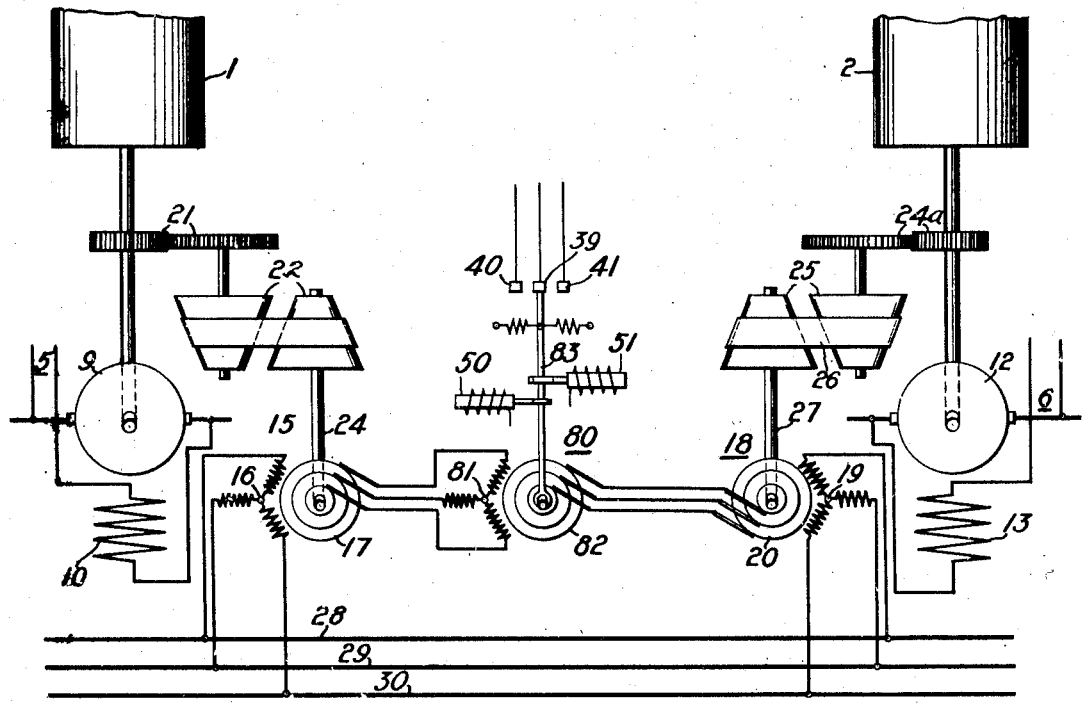
Figure 3:
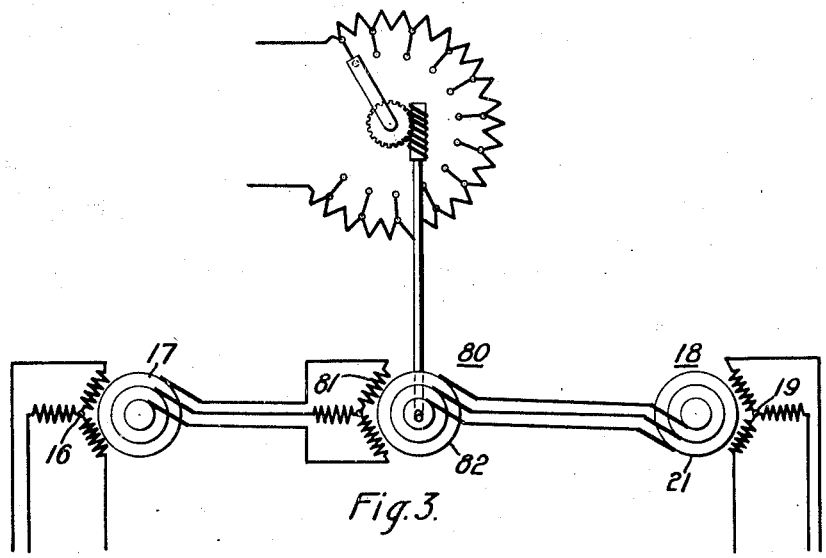

In the accompanying drawing, Figure 1 is a diagrammatic view of a speed-regulator system constructed in accordance with my invention, and Figs. 2 and 3 are modifications of the speed-regulator system shown in Fig. 1.

Referring to Fig. 1 of the accompanying drawing, two rolls 1 and 2 of a paper mill are provided with shafts 3 and 4 which are respectively connected to motors 5 and 6 by means of gearing systems 7 and 8. The motor 5, which is preferably a shunt-wound motor, is provided with an armature 9 and a shunt-field winding 10 which is connected in circuit with any suitable rheostat 11. The motor 6 comprises an armature 12 and a shunt-field winding 13 which is connected in circuit with any suitable regulating rheostat (not shown). The motors 5 and 6 are connected to any suitable generator 90. The generator 90 comprises an armature 91, a series field winding 92 and a shunt field winding 93. A resistor 94 is connected in circuit with the field winding 93 for varying the generator voltage to control the speeds of the motors 5 and 6.

A frequency changer 15, comprising a primary winding 16 and a secondary winding 17, is operated by the rotating member 1, and a frequency changer 18, comprising a primary winding 19 and a secondary winding 20, is operated by the rotating member 2. The rotor carrying the winding 17 of the frequency changer 15 is connected to the shaft 3 of the rotating member 1 by means of gear wheels 21, cone pulleys 22, which are joined by a flexible connector 23, and a shaft 24. The cone pulleys 22 and the flexible connector 23 are provided in the connection between the rotor and the rotating member in order to vary the ratio of speed between the rotating member 1 and the rotor and, accordingly, to adjust the frequency of the current which is produced by the frequency changer 15. The rotor carrying the winding 20 of the frequency changer 18 is connected to the shaft 4 of the rotating member 2 in a similar manner by means of gear wheels 24a, cone pulleys 25, which are connected by a flexible connector 26, and a shaft 27. The primary windings 16 and 19 of the frequency changers 15 and 18 are connected to a three-phase alternating-current supply circuit comprising conductors 28, 29 and 30.

An auxiliary frequency changer 31, which is common to all the rotating members, is provided with a primary winding 32—which is connected to the supply conductors 28, 29 and 30—and a rotor 33 which is directly connected, by a shaft 34, to a motor 35. The motor 35 is preferably a shunt-wound motor and is provided with any suitable means for varying its speed.

A control motor 14, preferably of the induction type and connected to act as an electric differential, is associated with the rotating member 1 and comprises a primary winding 36 and a secondary winding 37. The primary winding 36 is directly connected to the secondary winding 17 of the frequency changer 15, and the secondary winding 37 is directly connected to the secondary winding 33 of the auxiliary frequency changer 31. A contact arm 38 is connected to the rotor of the induction motor or electric differential 14 in any suitable manner to be operated in accordance with the rotation of the motor. The contact arm carries a contact member 39 which is adapted to engage contact members 40 and 41 according to the direction of rotation of the rotor of the motor. The connection between the contact arm 38 and the rotor of the motor or electric differential 14 should embody some suitable clutch in order to permit the free rotation of the rotor after the contact member 39 has engaged either the contact member 40 or the contact member 41.

A motor 42, comprising an armature 43 and two differential field windings 44 and 45, is provided for operating the rheostat 11 in accordance with the operation of the induction motor or electric differential 14. When the induction motor or electric differential 14 is operated in a counter-clockwise direction to effect engagement between the contact members 39 and 40, a circuit is completed from a battery 46 through the field winding 44 and the armature 43 for operating the motor 42 in a counter-clockwise direction to decrease the resistance value of the rheostat 11 which is included in circuit with the field winding 10 of the motor 5. Upon rotation of the induction motor 14 in a clockwise direction, engagement is effected between the contact members 39 and 41, and a circuit is completed from the battery 46, through the field winding 45 and the armature 43. Accordingly, the motor 42 is operated in a clockwise direction to increase the resistance value of the rheostat 11 which is included in circuit with the field winding 10 of the propelling motor 5. The motor 42 is connected to the contact arm 47 of the rheostat 11 in any suitable manner, as by means of a worm gearing 48.

In order to prevent sticking of the contact members 39 and 40 and 39 and 41 and to effect a step-by-step movement of the rheostat 11, a constantly operating device 49 is provided for intermittently returning the contact arm 38 to normal position, with the contact member 39 disengaged from the contact members 40 and 41. The device 49 comprises two electromagnets 50 and 51 which are intermittently energized from a battery 52 by means of a commutator cylinder 53 which is constantly operated by a motor 54. The electromagnet 50 comprises a winding 55 and a core armature 56 which is maintained in a retracted position by means of a spring member 57. The core armature 56 is provided with an arm 58 having a slotted end portion 59. The slotted end portion embraces the contact arm 38 and serves to return the contact arm to a neutral position under certain operating conditions. The electromagnet 51 is similar in construction to the electromagnet 50 and is provided with a slotted arm 60 which embraces the contact arm 38 and effects operation of the contact arm under certain conditions in accordance with the operation of the electromagnet 51. The slots in the arms 59 and 60 are of such length as to cause no movement of the arm 38 upon operation of the magnets 50 and 51 when the contact member 39 is in a neutral position and disengaged from the contact members 40 and 41. However, if the contact member 39 is in engagement with the contact member 41, upon operation of the magnet 51, the slotted arm 60 will return the arm 38 and the contact member 39 to a neutral position. In like manner, the electromagnet 50 operates the slotted arm 59 to disengage the contact members 39 and 40 and to return the contact arm 38 and the contact member 39 to neutral position. Thus, the electromagnets 50 and 51 are successively operated by the constantly rotating motor 54 and the commutator device 53 for intermittently separating the contact members 39 and 40 and 39 and 41, according to the operation of the induction motor 14 and to effect a step-by-step operation of the motor 42 and the rheostat 11.

An induction motor 61, similar to the induction motor 14, is associated with the rotating member 2 and comprises a secondary winding 62 and a primary winding 63. The primary winding 63 is connected to the secondary winding 20 of the frequency changer 18, and the secondary winding 62 is connected to the secondary winding 33 of the auxiliary frequency changer 31. The induction motor 61 is similar in construction and operation to the induction motor 14 and serves as an electrical differential to govern a rheostat (not shown) for governing the excitation of the motor 6. Inasmuch as the controlling of the speed of the rotating member 2 by the variation of the excitation of the motor 6 is similar to the controlling of the speed of the rotating member, it is deemed sufficient to describe only the operation of controlling the speed of the rotating member 1. However, it may be noted that any number of rotating members may be controlled in a similar manner to maintain a constant speed ratio between the members.

Assuming the connector 23 on the cone pulley 22 to be so adjusted that the frequency produced by the frequency changer 15 is the same as the frequency produced by the frequency changer 31 and no torque is produced by the induction motor 14, a change in the speed of the rotating member 1 will vary the frequency of the frequency changer 15 to operate the induction motor 14 in a clockwise or in a counter-clockwise direction. Assuming the speed of the rotating member 1 to be above normal value, the frequency of the frequency changer 15 is varied to operate the induction motor 14 in a counter-clockwise direction. Upon operation of the induction motor in a counter-clockwise direction, engagement is effected between the contact members 39 and 40, and a circuit is completed from the battery 46 for operating the motor 42 in a counter-clockwise direction. Thereupon, the rheostat 11 is operated to reduce the resistance included in circuit with the field winding 10 and, accordingly, to reduce the speed of the motor 5 and the rotating member 1 to normal value. During the operation of the induction motor 14 in a counter-clockwise direction, the electromagnet 50 is operated to intermittently separate the contact members 39 and 40 for effecting a step-by-step movement of the rheostat arm 47. Upon attaining normal speed by the rotating member 1, the frequence produced by the frequency changer 15 is returned to normal value, and operation of the induction motor 14 is stopped.

In the rotating member 1 is operating below normal speed, a frequency is produced by the frequency changer 15 for operating the induction motor 14 in a clockwise direction. Upon operation of the induction motor 14 in a clockwise direction, engagement is effected between the contact members 39 and 41 for completing a circuit from the battery 46 to operate the motor 42 in a clockwise direction. Thereupon, the rheostat 11 is operated to increased the resistance included in circuit with the field winding 10 and, consequently, to increase the speed of the motor 5 and the rotating member 1 to normal value. During the operation of the induction motor 14 in a clockwise direction, the electromagnet 51 effects intermittent operation of the contact member 39 for moving the rheostat contact arm 47 in a step-by-step manner.

In a like manner, the induction motor 61 is controlled by the frequency changer 18 and the frequency changer 31 for governing the excitation of the propelling motor 6 to maintain the speed of the rotating member 2 substantially constant. Likewise, any number of rotating members may be connected to, and controlled in accordance with the speed of, the auxiliary frequency changer 31 and, in case it is desired to change the speed of all rotating members without disturbing the speed ratio between the various members, it is only necessary to vary the voltage of the generator 90 which, in turn, controls the speed of the motors 5, 6, and 35.

Inasmuch as the system disclosed in Fig. 2 is similar, in many respects, to the system disclosed in Fig. 1, like parts are indicated by corresponding reference characters. In the system disclosed in Fig. 2, the speed of the propelling motor 5 is governed in accordance with the speed of the motor 6 and the rotating member 2 to maintain a constant speed ratio between the rotating members 1 and 2. In the same manner, the speed of the propelling motor 6 may be controlled in accordance with the speed of another propelling motor (not shown) and, in like manner, the speed ratio of any number of rotating parts may be maintained substantially constant. An induction motor 80, having a primary winding 81 and a secondary winding 82, is provided for operating a contact arm 83 similar to the operation of the contact arm 38 by the induction motor 14. The primary winding 81 is directly connected to the secondary winding 17 of the frequency changer 15, and the secondary winding 82 is directly connected to the secondary winding 20 of the frequency changer 18. Thus, the induction motor 80 is operated in accordance with the frequency produced by the frequency changers 15 and 18 and, consequently, in accordance with the relative speed of the rotating members 1 and 2.

The contact arm 83 of the induction motor 40 operates the contact member 39 to effect engagement between either the contact member 40 or the contact member 41 for operating the rheostat 11 to control the excitation of the motor 5, as disclosed in the system shown in Fig. 1 of the drawing. Electromagnets 50 and 51 are provided for intermittently operating the contact arm 83 similar to the operation of the contact arm 38 by the electromagnets 50 and 51 in the system shown in Fig. 1 of the drawing.

If the speed ratio between the rotating members 1 and 2 varies in any manner whatsoever, the frequencies produced by the frequency changers 15 and 18 effect operation of the induction motor 80 to engage the contact members 39 and 40 or 39 and 41 and, accordingly, to increase or decrease the excitation of the motor 5 to adjust the speed of the rotating member 1 to normal value. In like manner, the speed of the propelling motor 6 may be governed by an adjacent rotating member.

In Fig. 3 of the drawing, a modification of the system shown in Fig. 2 is illustrated, wherein the induction motor 80 directly operates the contact arm of the rheostat. It will be noted that, if so desired, the induction motor 14, shown in Fig. 1 of the drawing, may directly operate the rheostat contact arm 47 in a manner similar to the operation shown in Fig. 3. Since the operation of the system shown in Fig. 3 is exactly the same as the operation of the system shown in Fig. 2, further description of it is deemed unnecessary.

Modifications in the system and arrangement and location of parts may be made within the spirit and scope of my invention, and such modifications are intended to be covered by the appended claims.

I claim as my invention:

1. In a speed-regulator system, the combination with two rotating members, means comprising a motor for propelling each of said members, and a dynamo-electric machine jointly operated by said rotating members, of means operated by said dynamo-electric machine for controlling the speed of one of said motors, and having means co-operating therewith for preventing hunting action in said system.

2. In a speed-regulating system, the combination with two rotating members, means comprising a motor for propelling each of said members, and a dynamo-electric machine jointly operated by said rotating members, of means comprising a rheostat operated by said dynamo-electric machine for varying the excitation of one of said motors to maintain a constant speed ratio between said motors, and means for effecting a step-by-step operation of the rheostat by the dynamo-electric machine.

3. In a speed-regulator system, the combination comprising two frequency changers, a source of alternating current for energizing said frequency changers, separate means for rotating each of said frequency changers, means jointly controlled by the two frequency changers for maintaining their speed substantially constant, and electroresponsive means co-operating therewith for preventing hunting action in said system.

4. In a regulator system, the combination comprising a plurality of rotating members, a dynamo-electric machine operated by each member, an auxiliary dynamo-electric machine, means for controlling the speed of each rotating member, said means being jointly controlled by the auxiliary machine and the machine associated with each rotating member, and electroresponsive means for effecting a step-by-step movement of said control means.

5. In a system of motor control, the combination with an electric motor and a master speed member, of means for varying the permanent speed relationship between said motor and said speed member, said means comprising a resistance associated with said electric motor for gradually varying the excitation thereof, electroresponsive control means for governing said resistance, and means for intermittently interrupting the action of said electroresponsive control means.

6. In a system of motor control, the combination with an electric motor and a master speed member, of means for varying the permanent speed relationship between said motor and said speed member, said means comprising a resistance associated with said electric motor for gradually varying the excitation thereof, electroresponsive control means for governing said resistance, means for intermittently interrupting the action of said electroresponsive control means, said interrupting means comprising a pair of electromagnets for returning said electroresponsive control means to its neutral or inoperative position, and means for alternately energizing said electromagnets.

In testimony whereof, I have hereunto subscribed my name this 18th day of Sept. 1919.

STEPHEN A. STAEGE.